Figure 6:
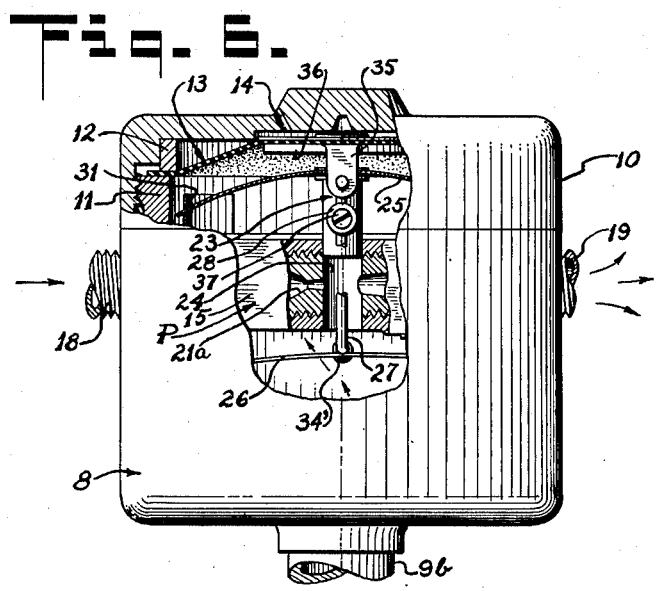

Jan. 2, 1951  LE ROY G. FOX  2,536,435
RESUSCITATOR CONTROL MEANS
Filed May 20, 1946  3 Sheets-Sheet 1
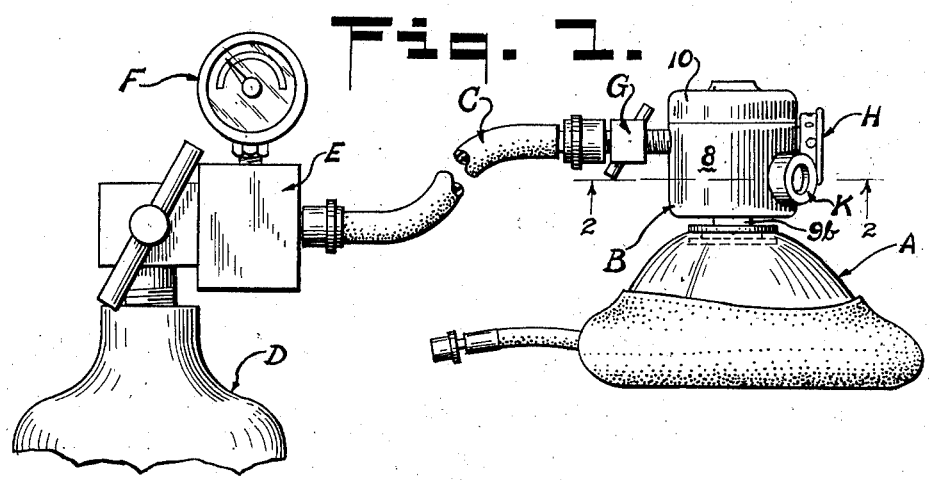
Fig. 1.
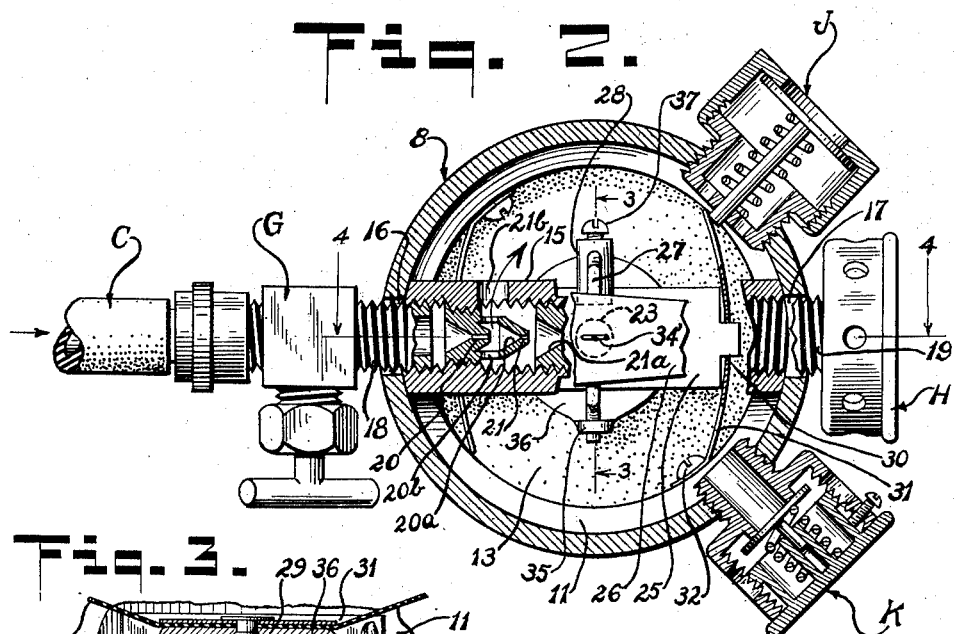
Fig. 2.
Fig. 3.
Inventor
LE ROY G. FOX
By R. S. Berry
Attorney Jan. 2, 1951  LE ROY G. FOX  2,536,435
RESUSCITATOR CONTROL MEANS
Filed May 20, 1946  3 Sheets-Sheet 2

Inventor
LE ROY G. FOX
By R. S. Burry
Attorney

Patented Jan. 2, 1951

2,536,435

UNITED STATES PATENT OFFICE 2,536,435

RESUSCITATOR CONTROL MEANS

Le Roy G. Fox, Glendale, Calif., assignor to E & J Manufacturing Company, a corporation of California Application May 20, 1946, Serial No. 671,026

14 Claims. (Cl. 137—153)

1

This invention relates to improvements in mechanical resuscitators of the pulmometric type such for example as shown in my United States Letters Patent No. 2,376,348 issued May 22, 1945, and more particularly pertains to an improved pressure responsive means for controlling the operation of such resuscitators and in fact, any other similar mechanism where a valve means is adapted to be operated by means of a pressure responsive diaphragm or the like.

It has been the practice in this art to operate the pressure-controlled valve means through the medium of a spring loaded toggle mechanism or the like which is connected with and actuated by a pressure responsive diaphragm, bellows or like device. These arrangements entail the use of a plurality of pivotally connected and pivotally mounted spring-loaded links and levers which have considerable lost motion and frequently get out of line and bind or stick and fail to properly open and close the valve means with a certainty and reliability which is most essential to a safe and effective resuscitation operation. Failure of such operating means in this manner may cause loss of life in treating critical asphyxia cases. Moreover, these toggle and link connections are relatively complicated, difficult to assemble, require use of a great number of moving parts which are operated under the spring load and take up considerable room.

It is therefore an important object of this invention to provide a simple, small and compact means of operative connection between a pressure responsive diaphragm and a control valve, which means consist of comparatively few parts, is free of the uncertainty of operation and objections which are characteristic of the toggle and link mechanisms heretofore employed, and makes it possible to use a simple form of valve with such valve and said means making a much more compact and dependable unit than heretofore provided.

A further object is to provide a control valve actuating means such as described which affords the advantages hereinbefore noted by reason of the fact that it includes a leaf spring on which the valve is mounted and which is constructed and arranged so that the valve will be opened and closed in a positive manner with a snap action upon the flexing of the spring past center when the diaphragm responds to differential pressures developed in the resuscitator.

A further object is to provide a valve mechanism in which the valve member is located at a point centrally of the ends of the over-center

2 leaf spring on which the valve member is supported, in order that the center thrust of said spring will pass in a straight line through the axis of the valve member and therefore eliminate angular thrusts on and consequent binding or sticking of the valve member.

Figure 7:
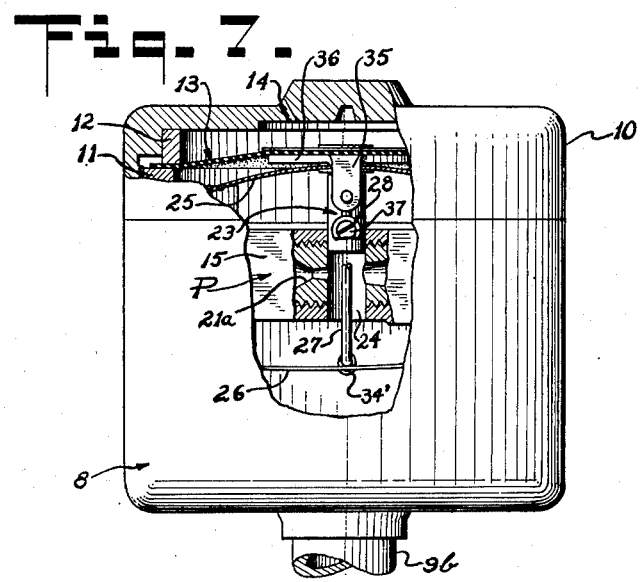
Figure 4:
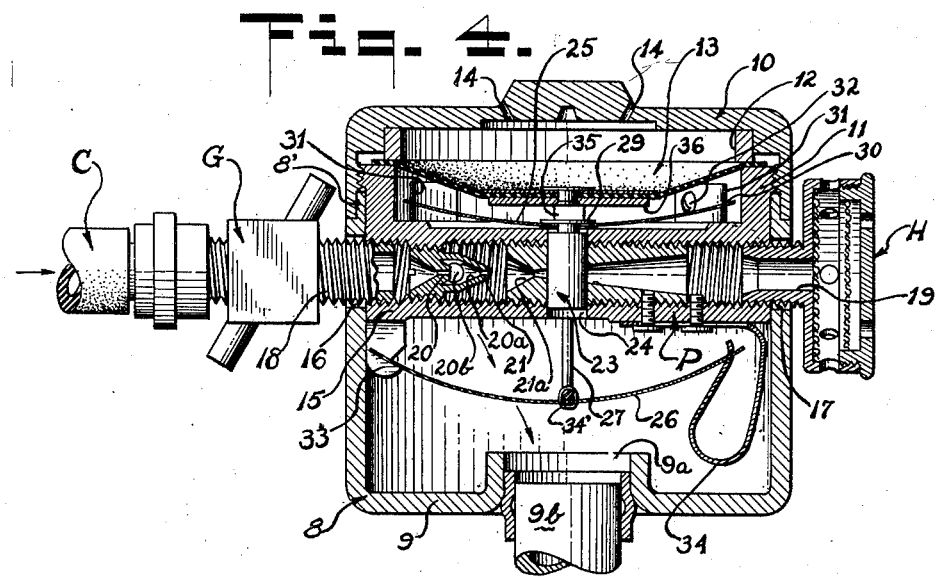
Figure 5:
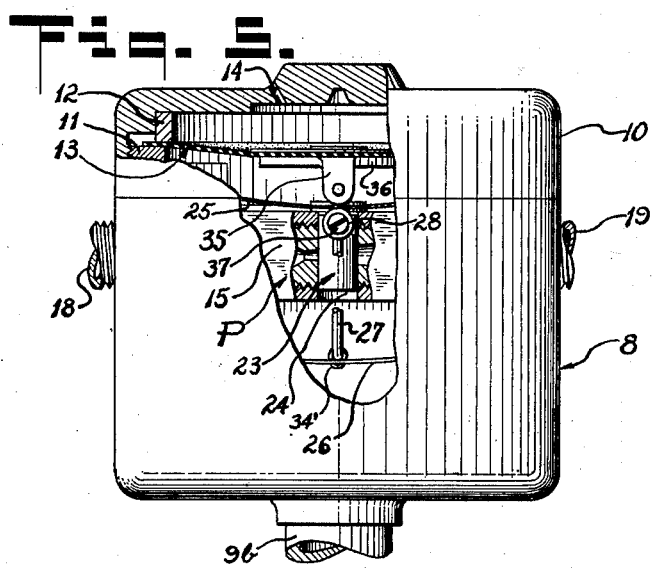

With the foregoing objects in view, together with such other objects and advantages as may subsequently appear, the invention resides in the parts and in the combination, construction and arrangement of parts hereinafter described and claimed, and illustrated by way of example in the accompanying drawing, in which Fig. 1 is a fragmentary elevational view of the resuscitator mechanism embodying the present invention, Fig. 2 is an enlarged fragmentary horizontal sectional view taken on the line 2—2 of Fig. 1, Fig. 3 is an enlarged detailed cross section taken on line 3—3 of Fig. 2, Fig. 4 is a sectional view taken on the line 4—4 of Fig. 2 showing the operating means of this invention and the valve as when the resuscitator is operating on the inspiratory cycle, the valve being then closed, Fig. 5 is a part sectional part elevational view with parts broken away so as to show the over center springs just before passing over center, the valve being shown as still closed, Fig. 6 is a fragmentary parts sectional parts elevational view corresponding to Fig. 5 but showing the valve operating means and valve in the position assumed when the resuscitator is operating on expiratory cycle, the valve being then opened, Fig. 7 is a part elevational part sectional view corresponding to Fig. 6 showing the valve operating means and valve as when the parts thereof have commenced to move towards the Fig. 4 position.

As shown in the accompanying drawing the present invention is embodied in a resuscitator which generally includes a mask A adapted to be applied over the face of a patient, a resuscitator unit B supported on the mask for supplying gas to and withdrawing gas from lungs of the patient through said mask, and a flexible gas supply line C connecting the unit B with a source of supply of gas under pressure indicated as D.

A pressure regulator E and pressure gage F are connected in the line C while a valve G in said line adjacent the unit B provides for control of the operation of the resuscitator.

Carried by the resuscitator unit B is a muffler H, a vacuum relief check valve J and a pressure relief check valve K which respectively muffles the noise of gas discharging into the atmosphere, prevents a dangerous sub-atmospheric pressure from being developed and likewise prevents a dangerous positive pressure from being developed.

The resuscitator unit B includes a small cylindrical housing 8 closed at one end by means of a wall 9 in which a port 9a affords communication of the housing with the mask through a nipple 9b carried on the mask and fitted in the port 9a so as to support the housing on the mask. The other end of the housing is closed by means of a flanged cap 10 into the internally threaded flange of which an annular frame member 11 is screwed. This frame member in cooperation with a spacer ring 12 grips the peripheral portion of a diaphragm 13 so as to hold the diaphragm in the cap. Openings 14 in the cap expose one side of the diaphragm to atmospheric pressure.

The annular member 11 is in part circumferentially spaced from the flange of the cap and defines an annular space which receives in close fit a reduced portion 8' of the upper end of the cylindrical wall of the housing when the cap and housing are fitted together, thus providing a fluid tight lap-joint.

A venturi or jet pump unit P carried by the member 1 within the housing, includes a tubular member or conduit 15 which is formed integral with the annular member 11 and extends across the housing with its ends in close fit with the cylindrical wall of the housing around openings 16 and 17. These openings are diametrically opposite one another in the cylindrical wall of the housing and register with the ends of the passage through the jet pump conduit 15 as shown in Figs. 2 and 4.

A fitting 18 connected with the valve G is extended through the opening 16 in the housing and screwed into one end of the jet pump conduit 15 for connecting the flexible gas line C thereto. A similar fitting 19 on the muffler H is extended through opening 17 in the housing and screwed into the other end of the jet pump conduit. The fittings 18 and 19 secure the housing 8 to the conduit 15 and as the latter is formed integral with the annular frame member 11 screwed into the cap 10, the housing and cap are therefore secured to one another in a fluid tight joint.

Arranged in the passage of jet pump conduit 15 is a jet pump means which includes coaxial nozzles 20 and 21 and associated constriction throats 20a and 21a as well as associated ports 20b and 21b. The port 21b is formed in the jet pump conduit 15 and affords communication of the latter with the chamber provided interiorly of the housing. At this point it should be noted that the opening 16 in the housing together with the fitting 18 and adjacent end of the bore of the conduit constitute an intake port means for directing gas under pressure through the jet pump nozzles, whereas the other end of the bore of the conduit 15 together with the fitting 19 and the muffler H constitute a discharge port means for discharging into the atmosphere the gas which passes through the conduit when the pump means is operated to create a pumping action at which time the port 21b serves as a suction port. When, however, the pump means is inoperative as a pump, the port 21b serves as a delivery port for introducing gas under pressure into the interior of the housing, whence it will be directed through the mask port means including the nipple 9b, then through the mask into the lungs of the patient.

The present invention deals particularly with a valve means inclusive of the operating means therefor which in one operation is closed and shuts off the flow of gas through the jet pump conduit 15 to the atmosphere through the muffler and thereby causes pressure fluid to flow through the ports 20b and 21b into the housing, thence into the mask for effecting the inspiratory cycle of the mechanism, and in the other instance is opened whereby gas will flow through the jet pump conduit to atmosphere and operate the jet pump means to create a sub-atmospheric pressure effective through ports 20b and 21b for withdrawing gas from the lungs of the patient, thereby operating the machine on the expiratory cycle.

As here provided the control of the resuscitator in the manner next above described is effected by means of a single valve 23 of the plunger type operating in a transverse opening 24 formed in the conduit 15 at a point between the jet pump nozzles (port 21b) and the atmospheric discharge end (muffler H) of the conduit. In the present instance this valve is located approximately centrally of the ends of said conduit.

The operation of the valve 23 responsive to movement of the diaphragm 13 is effected through the medium of a novel snap-action operating means which includes a leaf spring 25 supporting the valve 23 and arranged to be flexed past center to open the valve when directly contacted by the diaphragm moving in one direction; a similar leaf spring 26 connected by means of a yoke link 27 with the diaphragm; and an abutment member 28 arranged on said link to contact the spring 25 and flex it past center in the opposite direction so as to open the valve responsive to movement of the diaphragm in the opposite direction. In this arrangement, the leaf spring 26 is stronger than the valve supporting spring 25 and augments the snap-action in a particularly effective manner inasmuch as it will be flexed responsive to all movements of the diaphragm.

At a point approximately centrally of its ends, the valve-supporting spring 25 has the valve 23 somewhat loosely secured thereto by means of a suitable fastening 29 whereby the valve is universally movable relative to the spring and will move freely in the opening 24 therefor without sticking or binding. Extending across the annular member 11 in spaced parallel relation to the conduit 15, the spring 25 has its ends fitted in slots 30 provided intermediate the ends of leaf spring keepers 31 which latter are fastened as at 32 at their ends to the member 11. These keepers have their mid-portions spaced from the member 11 and support the spring 25 in a normally bowed and past center position subject to being reversely bowed, or in other words, flexed past center in either direction.

The leaf spring 26 is supported in spaced parallel relation to the conduit 15 between the latter and the wall 9 of the housing so that it is normally bowed and subject to being flexed past center in either direction. It has one end hooked into a notched lug 33 on the conduit 15 and its other end supported by a rebent spring keeper 34 likewise fixed to the conduit 15. This rebent keeper like the spring keepers 31 for the spring 25 will yield so as to allow the spring 26 to flex past center in either direction and it may be bent to vary the tension of the spring 26.

The yoke link 27 is U-shaped and loosely pivoted between its ends as at 34' to the center of the spring 26 so that it will straddle the conduit 15 in spaced relation to the sides thereof. The free ends of the link 27 are pivoted to ears 35 fixed to a disk 36 secured to the center of the diaphragm.

The abutment member 28 is in the form of a sleeve slidable on one of the arms of the link 27 but fixed thereon by means of a set screw 37 so that it will remain in a position in which it will contact and flex the spring 25 as aforesaid. In assembling this mechanism the member 28 is moved to a predetermined position in consideration of the desired timing of the mechanism and then set by tightening the set screw 37. The rebent spring keeper 34 is also subject to being bent at this time to provide the desired tension and action of the spring 26 in consideration of the desired timing of this mechanism.

Operation

With the valve 23 closed as shown in Figs. 2, 3, and 4 the resuscitator is ready for the inspiratory phase of its operation in which gas under pressure from the source D passes through line C into the conduit 15 but is shut-off from discharging past the closed valve and therefore flows out through ports 20b and 21b into the housing 8, thence through the fitting 9b, mask A and into the lungs of the patient. At this time the diaphragm 13 and springs 25 and 26 are bowed inwardly or downwardly as the case may be, past center and hold the valve 23 closed, the spring 25 then resting on the outer or upper side of the conduit which acts as a stop. It should be noted that the passage through the constriction throat 21a through which the valve passes when closed, is positively closed whereby all gas entering the conduit will discharge through the port 21b into the housing and thence to the patient as aforesaid.

When the gas pressure in the lungs of the patient reaches, say approximately 4 ounces (13 mm. of hg.) during this inspiratory phase, the pressure becomes effective against the diaphragm 13 so as to bow it outwardly against the top of the cap for opening the valve 23. Upon the initial outward bowing of the diaphragm the spring 26 flexes to near dead center position shown in Fig. 5 about the time the member 28 contacts and commences to flex the valve-carrying spring 25, so that as the outward bowing of the diaphragm continues, said member 28 continues to flex the spring 25, and, before the diaphragm has completed its outward bowing movement, the springs 25 and 26 will have moved with a snap-action past center, at which time the valve 23 is also moved with a snap-action into the open position shown in Fig. 6. It will be seen that inasmuch as the valve-carrying spring 25 is not connected with the diaphragm and when closed as shown in Fig. 4 is spaced inwardly from contact with the diaphragm, and becomes further spaced therefrom as shown in Fig. 5 incident to the abutment member 28 contacting the spring 25, said valve-carrying spring when once moved past dead center by said member 28 will move away from member 28 with a snap-action into the position shown in Fig. 5. At this time the spring 25 is spaced from the diaphragm and the abutment member 28, being in about mid-position therebetween. When the spring 25 moves past center under the urge of the member 28, the spring 26 also snaps past dead center and moves the diaphragm into its outermost bowed position with a snap-action in a much more positive manner than would be the case if the pressure of the fluid was relied upon to complete the movement of the diaphragm. Thus it will be seen that the springs 25 and 26 move past center at approximately the same time and that the spring 26 puts the diaphragm under a spring load and at all times and assures a reliable response thereof with a snap-action under critical predetermined fluid pressures, whereby the valve carrying spring 25 will also operate with a snap-action to assure a quick opening and closing of the valve in properly timed relation to such critical pressures.

The length of the valve 23 in consideration of the length of its stroke is such that spring 25 and spring 26 are well past dead center before the valve opens and closes the bore through the conduit 15 thereby reducing the time of change over from the inspiratory phase to the expiratory phase and vice versa and preventing fluttering or other improper action of the valve.

As soon as the valve 23 moves into the open position shown in Fig. 5, the gas under pressure flowing into the conduit 15 passes through the nozzles 21 and 22 then to atmosphere through the fitting 19 and muffler H. This initiates the expiratory phase, wherein the port 21b becomes a suction port as the venturi or jet pump means P produces a suction action which withdraws gas from the patient's lungs and discharges such gas to the atmosphere through fitting 19 and muffler H together with the gas which creates the pumping action in passing through the conduit. When a negative pressure in the patient's lungs and in the housing 8 reaches a value of for example somewhat less than 4 ounces (13 mm. of hg.) or any other similar value deemed to be safe, the diaphragm 13 commences to bow or move inwardly and moves a distance as indicated between Figs. 6 and 7 before the center of the diaphragm 13 contacts the valve carrying spring 25. In thus moving the diaphragm pulls on the link 27 and causes the spring 26 to flex to a point near a dead center position as shown in Fig. 7, while the valve 23 remains open. Continued movement of the diaphragm causes the spring 25 to flex past center and move the valve 23 with a snap-action into closed position shown in Fig. 4 thus restoring the machine to its inspiratory cycle, the spring 26 being also flexed past center substantially simultaneously with the past center movement of spring 25.

As long as the gas under pressure is directed to the resuscitator unit B through line C, said unit will operate cyclically in the manner herebefore described.

It is important to note that the thrust of the valve carrying spring 25 as well as that of the diaphragm connected spring 26 and also the diaphragm passes through the axis of the valve 23 in a straight line to the end that the valve will be positively moved without any angular thrust or operating movement which tends to cause binding or sticking and consequent improper cylical operation of the resuscitator. Moreover the mounting of the valve on a bowed leaf spring as here provided makes it unnecessary to employ spring-loaded toggle mechanisms such as heretofore used and assures that the valve will be properly operated with a very small and compact means which take up but little space, is easy to assemble, consist of comparatively few moving parts, and is therefore more reliable in operation than mechanisms heretofore used for connecting a valve means with a pressure-responsive diaphragm.

It will now be apparent that the resuscitator control means of the present invention embodies a novel means of operative connection between a pressure-responsive diaphragm, and a reciprocable valve member, for operating said valve member with a snap-action and at all times in a positive manner without likelihood of causing the valve member to bind or stick. Consequently it is to be understood that this means of operative connection, may be employed to advantage in other mechanisms and apparatus in substitution for toggles and like mechanisms which are usually employed to connect a pressure-responsive diaphragm to a reciprocable valve member which is to be operated responsive to the diaphragm.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a control means for the purpose described, the combination with a member having a fluid passage, a valve member movable from one to the other of two positions for controlling the flow of fluid in said passage, and a diaphragm movable in opposite directions responsive to fluid pressures applied on opposite sides thereof; of a means of operative connection between said diaphragm and said valve member including a leaf spring to which said valve member is fixed for movement responsive to the flexing of the spring in opposite directions; means supporting said spring so that it may be flexed in either direction past dead center; said spring being disposed so that it will be contacted and moved by said diaphragm past center to dispose the valve member with a snap-action into one of its two positions upon the movement of said diaphragm in one direction, and spring actuated means including a second spring connected to said diaphragm and arranged to move therewith into contact with said second mentioned spring for flexing said second mentioned spring with a snap-action past dead center to dispose said valve member in the other of its two positions responsive to movement of said diaphragm in the other direction.

2. In a control means for the purpose described, the combination with a member having a fluid passage, a valve member movable from one to the other of two positions for controlling the flow of fluid in said passage, and a diaphragm movable in opposite directions responsive to fluid pressures applied on opposite sides thereof; of a means of operative connection between said diaphragm and said valve member including a leaf spring to which said valve member is fixed for movement responsive to the flexing of the spring in opposite directions; means supporting said spring so that it may be flexed in either direction past dead center; said spring being disposed so that it will be contacted and moved by said diaphragm past center to dispose the valve member with a snap-action into one of its two positions upon the movement of said diaphragm in one direction, and spring actuated means including a leaf spring connected to said diaphragm and arranged to move therewith into contact with said second mentioned leaf spring for flexing said second mentioned leaf spring with a snap-action past dead center to dispose said valve member in the other of its two positions responsive to movement of said diaphragm in the other direction, said last named means being free from connection with said second leaf spring and said valve member and disposed to contact said second spring only when said diaphragm moves a predetermined extent less than its total movement in said other direction.

3. In a control means for the purpose described, the combination with a member having a fluid passage, a valve member movable from one to the other of two positions for controlling the flow of fluid in said passage, and a diaphragm movable in opposite directions responsive to fluid pressures applied on opposite sides thereof; of a means of operative connection between said diaphragm and said valve member including a leaf spring to which said valve member is fixed for movement responsive to the flexing of the spring in opposite directions; means supporting said spring so that it may be flexed in either direction past dead center; said spring being disposed so that it will be contacted and moved by said diaphragm past center to dispose the valve member with a snap-action into one of its two positions upon the movement of said diaphragm in one direction, a second leaf spring, means supporting said spring in a normally bowed position subject to being reversely bowed, a link connecting the second spring with said diaphragm so that said second spring will be flexed and moved past dead center responsive to movements of said diaphragm, and an abutment means on said link arranged to contact the first named spring and flex it past dead center to move the valve into the other of its two positions responsive to movement of said diaphragm in the other direction, the said springs acting when static to maintain said valve member in one or the other of its two positions.

4. In a control means for the purpose described, the combination with a housing in which are contained a member having a fluid passage, a valve member movable from one to the other of two positions from controlling the flow of fluid in said passage, and a diaphragm movable in opposite directions responsive to fluid pressure applied on opposite sides thereof; of a means of operative connection between said diaphragm and said valve member including a first spring to which said valve member is fixed for movement responsive to the flexing of the spring in opposite directions; means for supporting said spring so that it is normally bowed and is subject to flexure past dead center; said spring being disposed so that it will be contacted and moved by said diaphragm past dead center to dispose the valve member with a snap-action into one of its two positions upon the movement of said diaphragm in one direction, and means including a second spring connected with said diaphragm arranged to momentarily move into contact with said spring and flex it past dead center with a snap-action to dispose said valve member in the other of its two positions upon predetermined movement of said diaphragm in the other direction, said second spring being arranged to supplement the action of said first spring in moving said valve member.

5. In a control means for the purpose described, the combination with a housing in which are contained a member having a fluid passage, a valve member movable from one to the other of two positions for controlling the flow of fluid in said passage, and a diaphragm movable in opposite directions responsive to fluid pressures; of a first spring on which said valve is supported, means supporting said spring in a normally bowed and past dead center position in which the valve member is disposed in one of its two positions and the spring is subect to being reversely bowed to dispose the valve member in the other of its two positions, said spring and diaphragm being normally spaced apart and constructed and arranged so that when the diaphragm is moved in one direction it will contact and flex said spring past center to dispose said valve member in one of its two positions, and means including a second spring connected to and movable with said diaphragm and normally spaced from said valve member and said spring for momentarily contacting said spring and flexing it past center to dispose said valve member in the other of its two positions, said second spring being arranged to supplement the action of said first spring in moving said valve member.

6. In a control means for the purpose described, the combination with a housing in which are contained a member having a fluid passage, a valve member movable from one to the other of two positions for controlling the flow of fluid in said passage, and a diaphragm movable in opposite directions responsive to fluid pressure; of a leaf spring on which said valve is supported, means supporting said spring in a normally bowed and past dead center position in which the valve member is disposed in one of its two positions and the spring is subject to being reversely bowed to dispose the valve member in the other of its two positions, said spring and diaphragm being normally spaced apart and constructed and arranged so that when the diaphragm is moved in one direction it will contact and flex said spring past center to dispose said valve member in one of its two positions, a second leaf spring, means supporting the second leaf spring so that it may be moved from one normally bowed position to the other, a link connecting said second spring with said diaphragm in such manner that the second spring will normally bow in the same direction as to first named spring, and an abutment member on said link normally spaced from said first named spring and arranged to contact the first named spring and move it past center to dispose the valve member in the other of its two positions when the diaphragm is moved in the other direction.

7. In a resuscitator, a housing defining a chamber and provided with a port adapted for connection with a mask, a conduit transversing said chamber and having means at one end affording the attachment thereof to a source of gas under pressure and means at the other end providing a discharge port open to the outer atmosphere, jet pump means arranged in said conduit, a side port in said conduit for introducing gas into said chamber during the high pressure phase of operation of the resuscitator and for withdrawing gas from said chamber during the low pressure phase of operation of the resuscitator, a valve member operable for opening and closing the passage through said conduit at a point between said side port and said discharge port, a diaphragm in said housing movable in opposite direction responsive to fluid pressure applied to opposite sides thereof, a leaf spring on which said valve is supported, means supporting said leaf spring for flexing movement past dead center for opening and closing said valve, said spring being normally bowed to hold the valve in one or the other of its two positions and disposed in normally spaced relation to said diaphragm but in such position that the diaphragm in moving in one direction will contact the spring and flex it past dead center to dispose the valve in one of its two positions, and means, including a second spring arranged to move said valve member, connected with the diaphragm and normally unconnected with said spring for flexing the spring past dead center to dispose the valve member in the other of its two positions responsive to movement of the diaphragm in the other direction.

8. In a resuscitator, a housing defining a chamber and provided with a port adapted for connection with a mask, a conduit transversing said chamber and having means at one end affording the attachment thereof to a source of gas under pressure and means at the other end providing a discharge port open to the outer atmosphere, jet pump means arranged in said conduit, a side port in said conduit for introducing gas into said chamber during the high pressure phase of operation of the resuscitator and for withdrawing gas from said chamber during the low pressure phase of operation of the resuscitator, a valve operable for opening and closing the passage through said conduit at a point between said side port and said discharge port, a diaphragm in said housing movable in opposite direction responsive to fluid pressure applied to opposite sides thereof, a leaf spring on which said valve is supported, means supporting said leaf spring for flexing movement past dead center for opening and closing said valve, said spring being normally bowed to hold the valve in one or the other of its two positions and disposed in normally spaced relation to said diaphragm but in such position that the diaphragm in moving in one direction will contact the spring and flex it past dead center to dispose the valve in one of its two positions, a second leaf spring mounted in said housing so as to be subject to flexure past dead center in either direction, a link connecting said second spring with said diaphragm and a member on said link normally spaced from the first named spring and adapted to contact and move said first named spring past dead center to dispose the valve in the other of its two positions when the diaphragm is moved in the other direction.

9. A resuscitator comprising, in combination, a housing defining a gas-receiving chamber, said housing being provided with a port adapted for connection with a mask, conduit means transversing said chamber, said conduit means being fitted at one end for attachment to a source of gas under pressure and the other end thereof defining a discharge port open to the outer atmosphere, jet pump means mounted within said conduit and comprising a nozzle and constriction, a valve member movable from one to the other of two positions for opening and closing said discharge port, port means in said conduit communicating with said chamber, said port means being positioned at a point so that suction is created therethrough when said valve is open, said port means introducing gas from said conduit into said chamber when said valve is closed and withdrawing gas from said chamber into said conduit when said valve is open, and means for opening and closing said valve including a diaphragm movable in opposite direction responsive to changes in pressure in said housing, a leaf spring mounted between said diaphragm and said valve so that it is normally bowed past center and subject to be reversely bowed past center, means securing said valve member to said spring so that the valve member will be opened when the spring is flexed past center in one direction and closed when the spring is flexed past center in the other direction; said diaphragm operating during movement in one direction to contact said spring and flex it past center to dispose the valve in one of its two positions; and means, including a second spring arranged to move said valve member, connected with said diaphragm operable to contact said spring and flex it past center to dispose said valve in the other of its two positions responsive to movement of the diaphragm in the opposite direction.

10. A resuscitator comprising, in combination, a housing defining a gas-receiving chamber, said housing being provided with a port adapted for connection with a mask, conduit means transversing said chamber, said conduit means being fitted at one end for attachment to a source of gas under pressure and the other end thereof defining a discharge port open to the outer atmosphere, jet pump means mounted with said conduit and comprising a nozzle and constriction, a valve movable into one or the other of two positions for opening and closing said discharge port, port means in said conduit communicating with said chamber, said port means being positioned at a point so that suction is created therethrough by said jet pump means when said valve is open, said port means introducing gas from said conduit into said chamber when said valve is closed and withdrawing gas from said chamber into said conduit when said valve is open, and means for opening and closing said valve including a diaphragm movable in opposite direction responsive to changes in pressure in said housing a leaf spring mounted between said diaphragm and said valve so that it is normally bowed past center and subject to being reversely bowed past center, means securing said valve to said spring so that the valve will be opened when the spring is flexed past center in one direction and closed when the spring is flexed past center in the other direction; said diaphragm operating during movement in one direction to contact said spring and flex it past center to dispose the valve in one of its two positions, a second leaf spring mounted in the housing so that it is normally bowed and is subject to being reversely bowed, a link connecting said diaphragm with said second spring so that said second spring is bowed at all times in the same direction as the first named spring, and a member on said link normally spaced from the first named spring and adapted to contact and flex the first named spring and flex it past center to move the valve into the other of its positions when said second named spring is being flexed during movement of the diaphragm in the opposite direction.

11. In a fluid pressure operated control means for the purposes described, a member having a fluid passage therein, a valve member for controlling the flow of fluid from said passage, a normally bowed first spring mounted adjacent said first mentioned member and to which said valve member is fixed for movement with a snap action into and out of flow-controlling positions responsive to flexure of said spring into past center positions, and fluid pressure-responsive means, including a second spring arranged to move said valve member, normally out of engagement with said first spring and movable in opposite directions for flexing said first spring into said past center positions.

12. In a fluid pressure operated control means for the purposes described, a member having a fluid passage therein, a valve for controlling the flow of fluid from said passage, a normally bowed first spring mounted adjacent said member and to which said valve is fixed for movement with a snap action into and out of flow-controlling positions responsive to flexure of said spring into past center positions, and fluid pressure-responsive means including elements movable from positions spaced from said spring into positions for contacting said spring and flexing it into said past center positions, said last mentioned means including a second over center snap action spring arranged to supplement the action of said first spring.

13. In a fluid pressure responsive control means, a member having a fluid passage therein, a valve member movable into positions for controlling the flow of fluid from said passage, an over-center spring means mounted adjacent said member and on which said valve member is mounted for movement into its flow-controlling positions upon flexure of said spring means into over-center positions, a pressure-responsive diaphragm mounted adjacent said member so as to be spaced from contact with said spring means when the valve is in at least one of its flow-controlling positions, said diaphragm operating when moved in one direction to contact said spring means and move it into one of its over-center positions, means connected to the diaphragm and spaced from said spring means when the valve is in at least one of its flow-controlling positions, for contacting said spring means and moving it into an over-center position when the diaphragm is moved in the opposite direction, and another over-center spring means maintaining said diaphragm under spring load and arranged to supplement the action of the first mentioned spring in moving said valve member.

14. In a pressure-responsive flow control means, a valve means, a spring-loaded, fluid pressure-responsive element movable in opposite directions, a bowed first spring supporting said valve means and movable in one direction to operate the valve means with a snap-action responsive to movement of said pressure responsive element in one direction, and means carried by said pressure-responsive element normally spaced from said leaf spring and adapted to contact and move said leaf spring in the opposite direction to operate said valve means with a snap action when the pressure responsive element is moved in the opposite direction, said pressure responsive element being spring loaded to supplement the action of said first spring in moving said valve means.

LE ROY G. FOX.

REFERENCES CITED

The following references are of record in the file of this patent:

UNITED STATES PATENTS

| Number | Name | Date |
| --- | --- | --- |
| 1,242,287 | Weinberg | Oct. 9, 1917 |
| 1,523,351 | Schwimmer | Jan. 13, 1925 |
| 2,122,986 | Mason | July 5, 1933 |
| 2,376,348 | Fox | May 22, 1945 |